United States Patent [19]

Hiyama

[11] 4,355,419
[45] Oct. 19, 1982

[54] RADIO SIGNAL RECEIVING SYSTEM HAVING MEANS FOR SELECTIVELY COMBINING SIGNALS FROM A PLURALITY OF RECEIVING SECTIONS

[75] Inventor: Takashi Hiyama, Tokyo, Japan

[73] Assignee: Nippon Electric Co., Ltd., Tokyo, Japan

[21] Appl. No.: 147,876

[22] Filed: May 8, 1980

[30] Foreign Application Priority Data

May 14, 1979 [JP] Japan .................................. 54-58906

[51] Int. Cl.³ .............................................. H04B 1/10
[52] U.S. Cl. .................................... 455/303; 455/137
[58] Field of Search ............... 455/296, 302, 303, 304, 455/311, 137, 133, 134, 135, 140, 276–278; 375/58, 102

[56] References Cited

U.S. PATENT DOCUMENTS

| | | | |
|---|---|---|---|
| 2,470,292 | 5/1949 | Daniel | 455/140 |
| 4,017,859 | 4/1977 | Medwin | 455/137 |

FOREIGN PATENT DOCUMENTS

| | | | |
|---|---|---|---|
| 2824329 | 11/1979 | Fed. Rep. of Germany | 455/135 |
| 1078070 | 8/1967 | United Kingdom | 455/137 |
| 1109227 | 4/1968 | United Kingdom | 455/137 |
| 1411704 | 10/1975 | United Kingdom | 455/134 |

Primary Examiner—Tommy P. Chin
Attorney, Agent, or Firm—Laff, Whitesel, Conte & Saret

[57] ABSTRACT

A radio signal receiving system has first and second signal receiving sections, the outputs of which are combined to provide a combined signal. The signal combiner has first and second input terminals for respectively receiving the outputs of the first and second receiving sections. First, second and third interlocking switches are interconnected so that, when two outputs are derived in a normal state, from the first and second receiving sections, the first and second switches are closed, with the third switch opened. When either of the first or second outputs is driven out of the normal state, the first or second switch receiving the normal signal and the third switch is closed, while the first or second switch, receiving the abnormal signal, is opened. This way, the remaining normal signal replaces the abnormal signal to maintain the impedance balance in the system.

4 Claims, 7 Drawing Figures

RADIO SIGNAL RECEIVING SYSTEM HAVING MEANS FOR SELECTIVELY COMBINING SIGNALS FROM A PLURALITY OF RECEIVING SECTIONS

BACKGROUND OF THE INVENTION

The present invention relates to a radio signal receiving system having a plurality of receiving sections and, more particularly, to an improved signal combiner for such a system.

Such a receiving system comprises a plurality of receiving sections. A detector detects whether or not the outputs of the receiving sections are in normal state. A signal combiner operates responsive to the output of the detector for combining the outputs of the receiving sections and/or selectively allowing one of the outputs to pass therethrough. This construction ensures a considerably high reliability, for the receiving system.

In order to either combine the outputs of the receiving sections or select one of them, a conventional signal combiner includes detector-responsive switches which are respectively connected into the signal paths between the receiving sections and the combining circuit placed in the signal combiner. Two receiving sections are usually employed, with two signal paths coupled thereto. When both of the signal paths are in a normal condition, the signal on one transmission path is combined with the signal on the other path, by means of a resistor hybrid circuit disposed at a stage positioned after the switches. The resulting combined signal is led to an output terminal.

When either of the transmission paths is driven out of the normal state, only the signal transmitted through the normal path is led to the output terminal, through the hybrid circuit. In such a signal combiner operation, the switches are connected in series, with respect to the signal paths. For this reason, the output impedance and the output voltage of the combiner may vary depending upon whether the output is a combined signal or the switch-selected signal.

An object of the present invention is, therefore, to provide a signal combiner which is free from the problems involved in the conventional circuit.

According to the present invention, a radio signal receiving system has first and second signal receiving sections and a signal combiner for selectively passing the outputs of the signal receiving sections, in order to provide a combined signal. The signal combiner has first and second input terminals for respectively receiving the outputs of the first and second receiving sections. A combining circuit has first and second arms and an output terminal. First and second switches are connected between the first input terminal and the first arm, and between the second input terminal and the second arm, respectively a third switch is connected between the first and second arms and is interlocked with the first and second switches. Means are connected to the first and second input terminals for controlling the first, second and third switches so that, when the two outputs derived from the first and second receiving sections are in normal state, the first and second switches are closed, with the third switch opened. When either of the two outputs is driven out of the normal state, the first or second switch receiving the normal signal and the third switches are closed, with the first or second switch receiving the abnormal signal opened.

BRIEF DESCRIPTION OF THE DRAWINGS

Other objects and features of the present invention will be apparent from the following description taken in connection with the accompanying drawings in which.

DETAILED DESCRIPTION OF THE INVENTION

Figure 1:
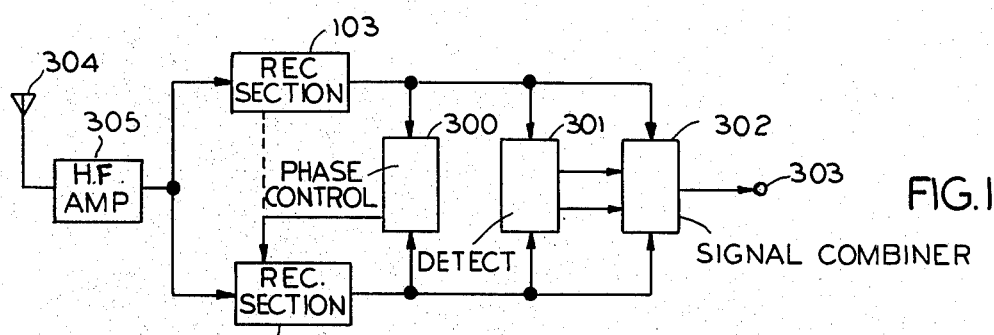
FIG. 1 is a block diagram showing a receiving system having a pair of receiving sections with a signal combiner coupled thereto.

In FIG. 1, a modulated carrier wave, received by an antenna 304, is amplified by a high frequency amplifier 305, and is then divided into two signals which are applied to respective receiving sections 103 and 203. The receiving sections or channels 103 and 203 respectively demodulate the carrier waves from the amplifier 305. When both of the demodulated signals are in normal state, a signal combiner 302 responds to a control signal derived from a detecting circuit 301, and combines the demodulated signal to provide a combined signal at an output terminal 303. When either of the demodulated signals is driven out of the normal state, the combiner 302 responds to the control signal and leads only the normal demodulated signal to the output terminal 303.

The detecting circuit 301 detects whether or not the demodulated signals are in normal state, based on either the signal to noise ratio (S/N) of the demodulated signals, or the presence or absence of either the demodulated signals or pilot signals. The detecting circuit 301, for example, may be constructed from band pass filters having pass band frequencies which are set to a noise frequency and from detectors for respectively detecting the S/N ratio of the filter outputs to produce the control signal for the combiner 302.

In the system shown in FIG. 1, the signal combination may be performed either in the intermediate frequency (IF) band or base band (BB) region.

In a combiner for the IF region, the receiving sections 103 and 203 comprise a frequency converter for converting a radio frequency into an intermediate frequency, as described in the system of the cited U.S. Pat. No. 4,079,318. In a combiner for the BB region, the receiving sections 103 and 203 comprise a demodulator (for example, a frequency discriminator) for regenerating the base band signal from a radio frequency signal.

Figure 2A:
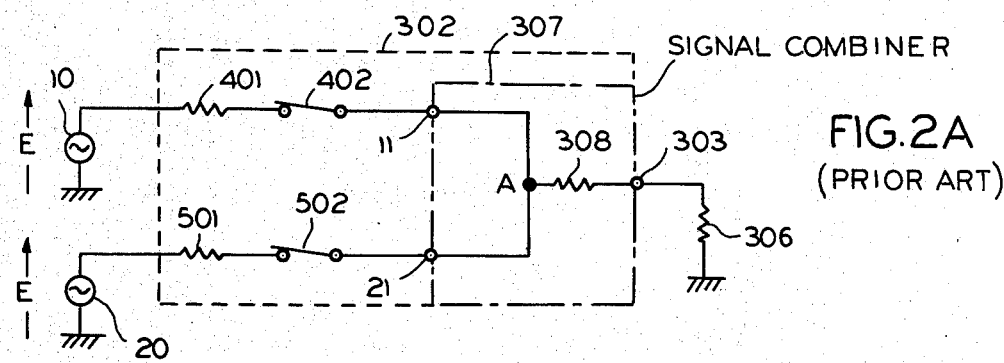
FIG. 2A is a schematic circuit diagram showing a conventional signal combiner.

The signal combiner 302 will now be described in detail. In FIG. 2A, it is assumed that the sources 10 and 20 are constant voltage sources, are unbalanced with respect to ground, and have outputs with the same phase.

In FIG. 1, it is easy to make each of the receiving sections 103 and 203 a constant voltage sources. This is achieved by using, for example, an automatic gain control (AGC) amplifier, as disclosed in the U.S. Pat. No. 3,879,664, entitled "HIGH SPEED DIGITAL COMMUNICATION RECEIVER," and issued to Peter Monson, Apr. 22, 1975. It is well known in the art that an AGC amplifier has a substantially constant output amplitude over a range of input variations of source amplitude characteristics. Therefore, the receiving sections 103 and 203 can be regarded as the constant voltage sources. Also, the outputs of the receiver sections 103 and 203 can be placed in phase by the phase control circuit 300. This phase control operation is described in detail in the above-mentioned U.S. Pat. No. 4,078,318. Switches 402 and 502 respond to a control signal from the detecting circuit 301 of FIG. 1, which is able to detect whether the outputs of the sources 10 and 20 are in a normal or an abnormal range.

When both of the signal sources 10 and 20 are in a normal condition, both of the switches 402 and 502 are closed. The signals from the signal sources 10 and 20 are applied to the input terminals 11 and 21 of a signal combining section 307, via loads 401 and 501 and switches 402 and 502, respectively. The signals, thus applied, are combined at a point A within the combining section 307 and the combined signal is led to an output terminal 303, via a load 308. On the other hand, when either of the signal sources 10 or 20 is in abnormal condition, the switch in the transmission path carrying the abnormal signal is opened. The path carrying the normal signal is led to the point A, of the combining section 307, to allow that signal to be supplied to the output terminal 303 via the load 308.

In general, a load 306 is connected to the output terminal 303. The signals from the constant voltage sources 10 and 20 have the same amplitude (effective value E) and the same phase. Accordingly, when both of the signal sources 10 and 20 are in a normal condition, the output impedance at the output terminal 303 of the combiner 302 is given by:

$$(Zs/2)+Z,$$

where Zs is the impedance of the loads 401 and 501, and Z is the impedance of the load 308. When either of the signal sources 10 or 20 is driven out of the normal condition, the output impedance at the output terminal 303 is expressed by:

$$Zs+Z.$$

Output voltages developed across the load 306 in the two above-mentioned cases are, respectively:

$$\frac{Z1}{(Zs/2) + Z + Z1} \times E \text{ and } \frac{Z1}{Zs + Z + Z1} \times E,$$

where Z1 is the impedance of the load 306. As described above, the conventional signal combiner is shown in FIG. 2A. The output impedance and the output voltage vary in response to the switched state of the switches.

In order to reduce those variations, it is necessary to make the impedance Zs of the load 401 and 501 as small as possible. However, when the impedance Zs is made excessively small, practical signal sources 10 and 20 are not ideal constant voltage sources. Further, due to a saturation phenomenon caused by the low impedances of those loads, the waveform of the combined signal is distorted by even a slight difference between either the amplitudes or the phases of the signals from the voltage sources 10 and 20.

Figure 2B:
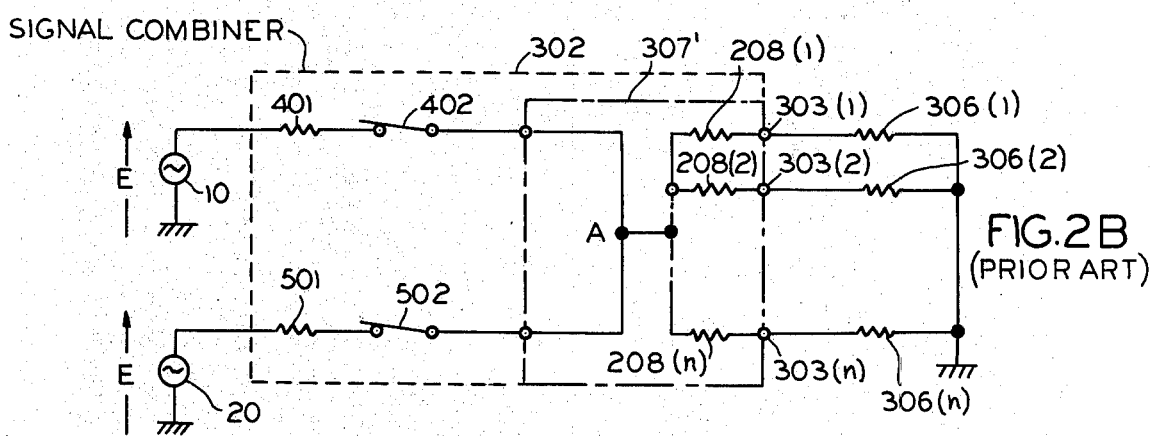
FIG. 2B is a schematic circuit diagram showing another conventional signal combiner having means for branching out the combined signal.

In FIG. 2B, in order to branch out the combined signal into a plurality of loads 306(1) to 306(n), a signal combining section 307' includes loads 208(1) to 208(n) which are connected in parallel to a combining point A. The output terminals 303(1) to 303(n) couple those loads 208(1) to 208(n) with the loads 306(1) to 306(n). In this signal combiner (FIG. 2B), the load impedance viewed from the combining point A is smaller than the load at point A in FIG. 2A. Therefore, the impedances of the loads 401 and 501 of FIG. 2B must be even smaller than the loads 401 and 501 of FIG. 2A. Accordingly, it is difficult to branch out the combined signal due to the distortion caused by the saturation phenomenon.

Figure 3:
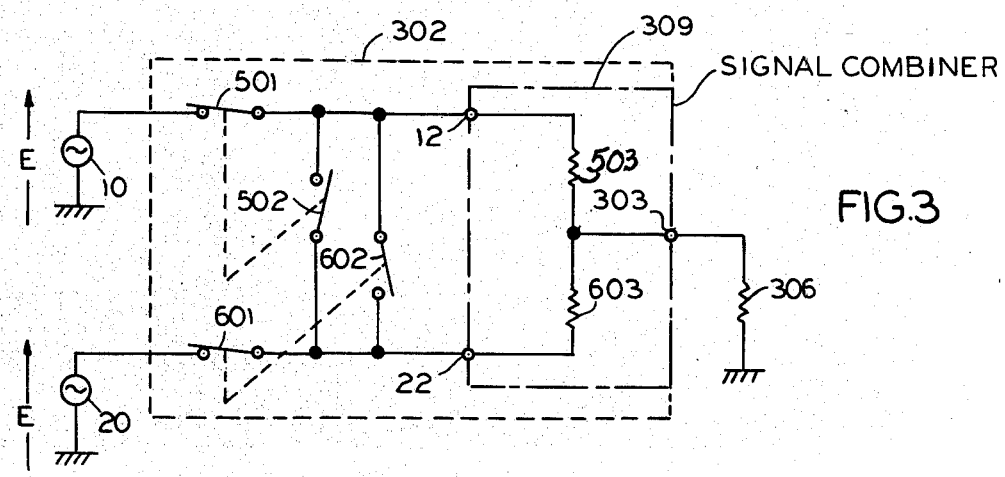
FIG. 3 is a schematic circuit diagram showing an embodiment of a signal combiner according to the present invention.

FIG. 3 shows one embodiment of the invention, wherein the constant voltage sources 10 and 20 are respectively connected to the input terminals 12 and 22 of a signal combining section 309, via switches 501 and 601. Between the input terminals 12 and 22 are connected switches 502 and 602, which are interlocking with the switches 501 and 601, respectively (as indicated by dashed lines). All of these switches operate in response to the control signals from the control circuit 301 (FIG. 1). When both of the signal sources 10 and 20 are in normal condition, both of the switches 501 and 601 are closed, while both of the switches 502 and 602 are open. Accordingly, the signals from the signal sources 10 and 20 are combined through the switches 501 and 601 and the loads 503 and 603 (each having an impedance Zs), and the combined signal is led to the output terminal 303.

When the signal source 20 is in an abnormal condition, the switches 501 and 602 are closed while the switches 601 and 502 are open. As a result, the signal from the normal signal source 10 passes through the switch 501 to be split into two; one part being applied to the terminal 12 and the other to the terminal 22 via the switch 602. The signals thus applied to the terminals 12 and 22 are combined by the signal combining section 309 and then the combined signal is led to the output terminal 303. Similarly, when the signal source 10 is driven out of the normal state, the switches 601 and 502 are closed, while the switches 501 and 602 are opened. The signal from the normal signal source 20 is led to the output terminal 303 via the parallel-connected loads 503 and 603.

As earlier described, the signals from the constant voltage sources 10 and 20 have the same amplitude and the same phase as well as the receiving sections 103 and 203 (FIG. 1). Therefore, the output impedance of the signal combiner at the output terminal 303 may be expressed as follows, irrespective of the above-mentioned states of those signals:

$$E \cdot Z1/(Z1+Zs/2)$$

and the output voltage is given by
$$E \cdot Z1/Z1+Zs/2)$$

Thus, the output impedance and the output voltage are invariable under any condition of the circuit. In most cases, the loads 503 and 603 are generally matched with the load 306. Therefore, the impedance of the load 503 or 603 is larger than the impedance of the load 306, e.g. two times the impedance Z1 of the load 306. As a result, the output of the signal combiner in this embodiment is free from the signal distortion in the combined signal which is due to the saturation of the signal source, as occurs in the combiner shown in FIG. 1.

Figure 4:
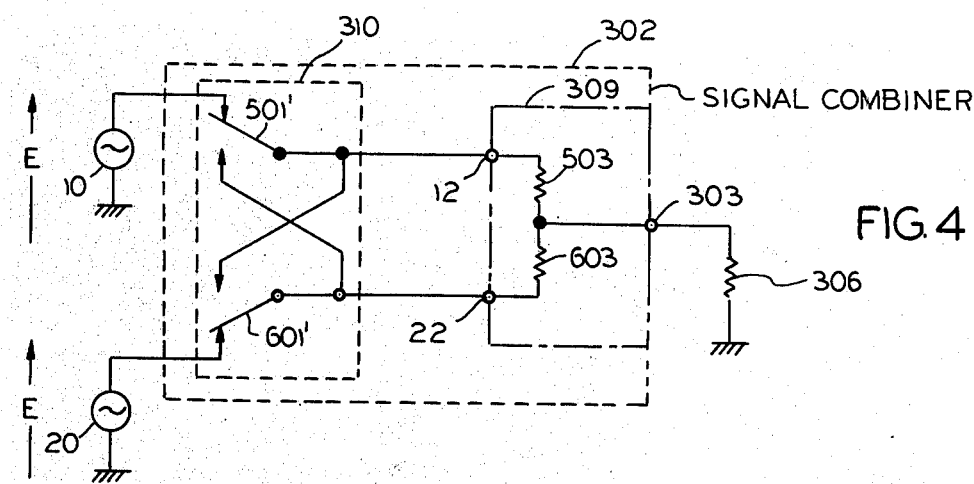
FIGS. 4 and 5 are schematic circuit diagrams showing modifications of the circuit shown in FIG. 3 in which a switching section of the circuit shown in FIG. 3 is replaced by other switches.

In FIG. 4, those switches 501, 502, 601 and 602 which are shown in FIG. 3 are embodied in the form of a changeover or transfer relay switch 310. The signal combining operation in this embodiment is substantially the same as that in FIG. 3.

Figure 5:
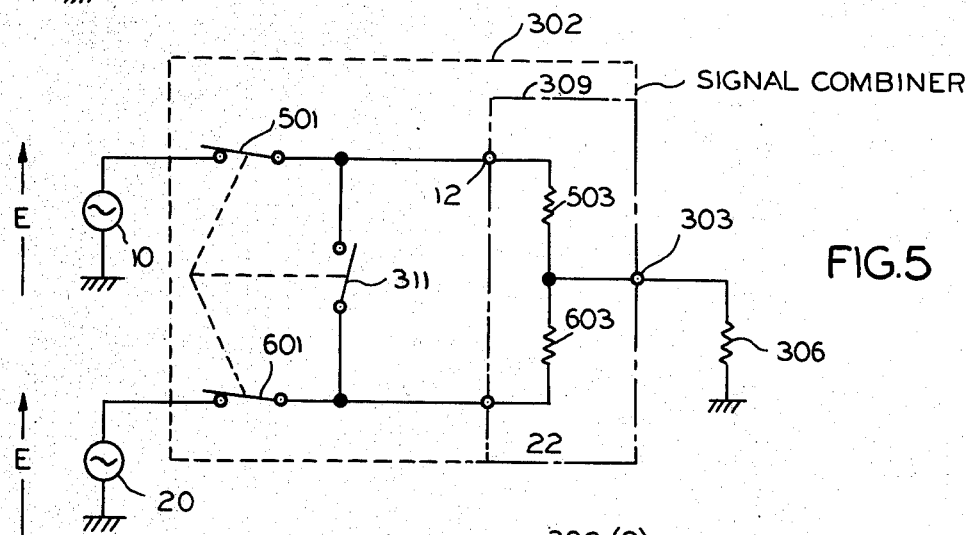

An embodiment shown in FIG. 5 uses a single switch 311 instead of the two switches 502 and 602 shown in FIG. 3. The switch 311 is interlocked with the switches 501 and 601 (as indicated by dashed lines) in such a way that it opens when both of the signal sources 10 and 20 are in a normal condition and closes when either of the signal sources is driven out of the normal condition. The combining operation in this embodiment is substantially the same as that in FIGS. 3 and 4.

Figure 6:
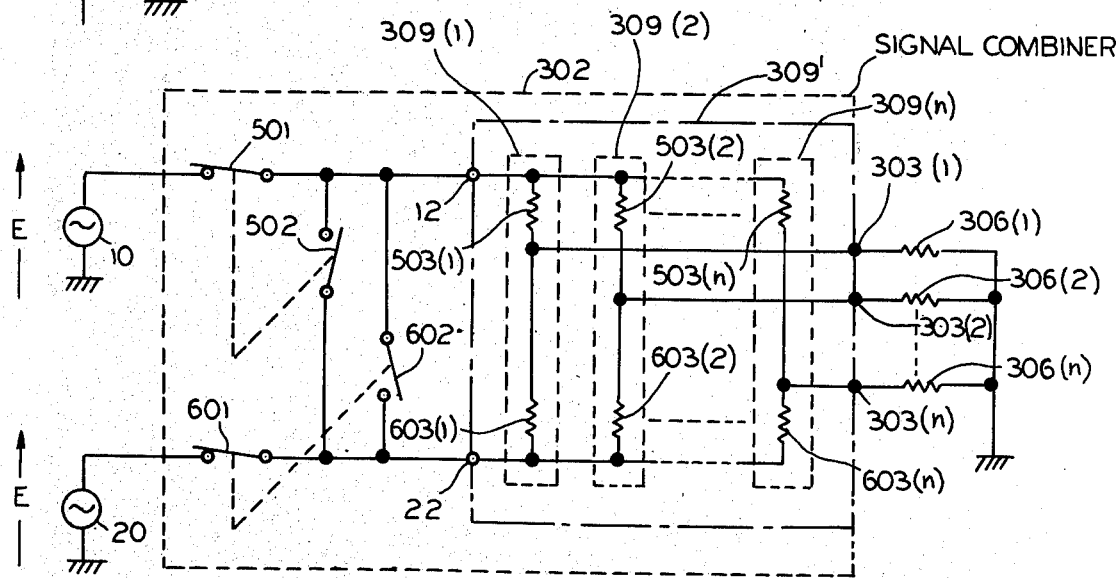
FIG. 6 is a schematic circuit diagram showing another embodiment of a signal combiner according to the present invention in which means for branching out the combined signal is provided.

In FIG. 6, a combining section 309' has a plurality of combining sections 309(l) to 309(n) connected in parallel as shown in FIG. 3, in order to split the combined signal into a plurality of signals, which are applied to the plurality of loads 306(l) to 306(n). The switching operation of the switches are the same as those in FIGS. 3 to 5. There is no variation in the output impedance and the output voltage at the output terminals 303(l) to 303(n) which receive the split signals, respectively as is in the case of FIG. 3. In general, loads 503(l) to 503(n) and 603(l) to 603(n) in the signal combining section 309(l) to 309(n) are larger than the output loads 306(l) to 306(n). Accordingly, the signal combiner shown in FIG. 6 can produce the desired split signals as long as no distortion takes place in the constant voltage sources 10 and 20 due to the loads 306(l) to 306(n).

It will be apparent from the foregoing description that the signal combiner according to the present invention is applicable not only to the parallel-signal-path reception system as shown in FIG. 1 but also to frequency and/or space diversity reception system.

What is claimed is:

1. A radio signal receiving system having first and second signal receiving section means for providing output signals having substantially equal amplitudes and a signal combiner means coupled directly to outputs of said receiving section means for combining the outputs thereof to provide a combined signal having a substantially constant voltage, said first and second receiving section means being unbalanced with respect to ground, said signal combiner comprising: a first and a second input terminal means for respectively receiving the outputs of individually associated ones of said first and second receiving section means; circuit means having at least a set of first and second receiving terminals and an output terminal, said first and second receiving terminals being connected with two resistors in series, said output terminals being connected to the junction of said resistors; first switching means connected between said first input terminal and said first receiving terminal, second switching means coupled between said second input terminal and said second receiving terminal; third switching means connected between said first and second receiving terminals and interlocked to close when either one of said first and second switching means opens; and means connected to said first and second input terminal means for controlling said first, second and third switching means so that said first and second switching means are closed and said third interlocked switching means is opened in a normal state representing those outputs which are derived from said first and second receiving section means when they are above any one of a predetermined signal-to-noise ratio, a predetermined signal level, and a predetermined pilot signal level and if either of said two outputs is driven out of said normal state, the one of said first and second switching means which receives a signal in the normal state remaining closed with said third switching means closing, while the one of said first and second switching means which receives a signal driven out of the normal state is opened.

2. A radio signal receiving system as claimed in claim 6, in which said signal combiner further comprises means connected to said first and second input terminal means for bringing the outputs of said first and second signal receiving section means in phase.

3. A radio signal receiving system as claimed in claim 1 or 2, in which said combining circuit comprises a plurality of output terminals; a first plurality of resistors respectively connected between said first receiving terminal and each of said plurality of output terminals; a second plurality of resistors respectively connected between said second receiving terminal and said plurality of output terminals.

4. A radio signal receiving system as claimed in claim 1 or 2, in which each of said first, second and third switching means includes a transfer relay switch.

* * * * *